United States Patent

Haerther et al.

[11] Patent Number: 4,540,879
[45] Date of Patent: Sep. 10, 1985

[54] ALIGNMENT TOOLING FOR METAL CYLINDER WELDING MACHINES

[75] Inventors: William W. Haerther, Geneva; T. Jayes Hartz, Downers Grove, both of Ill.

[73] Assignee: Ideal Carbide Die Co., Chicago Ridge, Ill.

[21] Appl. No.: 502,501

[22] Filed: Jun. 9, 1983

[51] Int. Cl.³ .............................................. B23K 11/06
[52] U.S. Cl. ...................................... 219/61.3; 219/64
[58] Field of Search ................... 219/61.13, 61.3, 64, 219/59.1, 61.1

[56] References Cited

U.S. PATENT DOCUMENTS

| 853,351 | 5/1907 | Fulton | 219/64 |
|---|---|---|---|
| 904,771 | 11/1908 | Fulton | 219/64 |
| 2,307,089 | 1/1943 | Winters | 219/64 |
| 2,771,046 | 11/1956 | Williams et al. | 72/367 |
| 3,109,914 | 11/1963 | McCoy | 219/64 |
| 3,285,490 | 11/1966 | Roper | 228/17.5 |
| 3,834,010 | 9/1974 | Wolfe et al. | 219/64 |
| 4,145,986 | 3/1979 | Bauer | 219/64 |
| 4,160,892 | 7/1979 | Opprecht et al. | 219/83 |
| 4,162,382 | 7/1979 | Schalch | 219/64 |
| 4,214,140 | 7/1980 | Opprecht | 219/61.3 |
| 4,332,994 | 6/1982 | Opprecht | 219/64 |

FOREIGN PATENT DOCUMENTS 1022719 1/1958 Fed. Rep. of Germany .
2426379 1/1975 Fed. Rep. of Germany .

Primary Examiner—Roy N. Envall, Jr.
Assistant Examiner—Alfred S. Keve
Attorney, Agent, or Firm—Hill, Van Santen, Steadman & Simpson

[57] ABSTRACT

An alignment tool is provided for use in a metal cylindrical can welding machine which is an integral unit constructed of discrete component parts comprising an insulating part and a guide part of high strength and hardness. The insulating part prevents electrical current from passing through the alignment tool thereby preventing spark erosion, increased wear and inefficiency. The high strength part provides the necessary characteristics required for guiding the edges of the can body blanks to the welding rollers and can be selectively replaced for repair or modification thereby reducing repair costs.

11 Claims, 5 Drawing Figures

ALIGNMENT TOOLING FOR METAL CYLINDER WELDING MACHINES

BACKGROUND OF THE INVENTION

1. Field of the Invention

This invention relates to alignment tools for use in metal cylinder welding machines, and in particular to the construction of such tooling.

2. Brief Description of the Prior Art

During the process of forming cylindrical metallic can bodies from flat blank material, it is necessary for the blanks to be urged into a cylindrical shape. As this occurs, two ends of the blank are brought together to form a longitudinal seam which must be welded to provide a sealed joint along that portion of the can body.

Alignment of the edges of the blanks just prior to the welding process is critical. Special alignment tools have been developed which accomplish this function. For instance, U.S. Pat. Nos. 3,109,914 and 4,214,140 disclose prior art alignment tools, commonly referred to as Z-bars, which perform this alignment function. Such alignment tools have opposed and slightly offset grooves through which the ends of the blanks are passed during the can forming process.

In the process of forming welded metal cylinders, several conditions are encountered which prevent one material from being the optimum for all operating conditions. For example, in high speed resistance welding lines, the cylinder edges to be welded are held apart from each other and aligned accurately for positioning the edges for seam welding by the alignment tool or Z-bar. At high speeds of, for example, 200 to 600 cylinders being welded per minute, which corresponds to 100 to 300 lineal feet per minute, the frictional forces of the edges traveling in the Z grooves creates a wear problem in the positioning grooves. When the grooves wear, the amount of seam overlap changes. Improper positioning of the cylinder edges results, causing less than optimum cylinder formation or welding conditions. To minimize wear, commercial welding machines employing this type of tooling have used materials such as white cast iron or hardened tool steels with typical hardnesses of 58 as measured on the Rockwell C scale.

Another problem typically encountered in the use of high speed commercial cylinder welding machines is electrical short circuits between the welding rollers and the remainder of the welding machine through the Z-bar tooling which is used to align the cylinders on their way to the welding station. To eliminate the short circuits, the Z-bar tooling is normally insulated with an electrical insulating tape or hard fiber materials exhibiting dielectric strengths in the range of 250 to 500 volts per millimeter. During the operation of these welding machines, humidity changes, temperature changes, and condensation occur and tend to break down the insulating materials. Eventually some electrical currents do pass from the welding rollers through the Z-bar tooling. As formed cylinders pass along the tooling, tiny sparks arc across at any small gap between the cylinders and the tooling. Ultimately, such sparking causes an erosion of the tooling resulting in premature loss of tool life. Sparking also creates a "slag dust" build-up on the alignment tooling which can also cause premature wear as well as changing the positioning of the cylinder edges.

Another typical operating problem of high speed cylinder welding is the tensile stresses generated in the Z-bar tooling when the cylinders jam due to either "stumbling" of the cylinder at high speed or due to improper timing of the cylinder movement along the tooling.

SUMMARY OF THE INVENTION

The present invention solves the problems of the prior art by providing an alignment tool which has a high electrical resistance to minimize short circuiting while affording the advantages of high hardness value and high strength.

Wear in steel or cast iron tooling is minimized by substituting cemented tungsten carbide tooling having a typical range of 3% to 25% cobalt binder, the balance being tungsten carbide grains. Although the Rockwell hardness tests are somewhat inadequate for measuring the hardness of cemented tungsten carbide, because it measures the amount of cobalt binder, test values range from 67 to 83 as measured on the Rockwell C scale. Scratch hardness tests indicate the tungsten carbide particles are between saffire and diamond in hardness. Significant improvement in wear life of tooling, sometimes as much as ten times life cycle, is experienced when cemented tungsten carbide tooling is subtituted for ferrous materials, such as hardened tool steels.

It is also contemplated by this invention to substitute ceramic material such as aluminum oxide with typical chemical composition of 85% to 97% $AL_2O_3$ with the balance typically being comprised of, but not limited to $SiO_2$, $MgO$, $CaO$ which are used to control grain properties in the ultimate properties of the $Al_2O_3$.

However, such ceramic materials tend to be more brittle and weaker than cemented tungsten carbide with Young's modulus values of $32-47 \times 10^6$ verses $61-94.3 \times 10^6$ for cemented tungsten carbide. Compressive strength is also less, being 235,000-350,000 PSI for the aluminum oxide type ceramics while cemented tungsten carbide typically ranges from 550,000-800,000 PSI.

It is recognized that electrical conductivity of steels is higher than cemented tungsten carbide. We have discovered on the basis of limited trials involving as many as 24,000,000 cylinders welded on cemented tungsten carbide alignment tooling that significantly less arc erosion does in fact occur when compared to commercially available hardened tool steel and/or cast iron tooling. Electrical conductivity of ceramic materials such as aluminum oxide is even lower than that of cemented tungsten carbide. Thus, as an electrical insulator, the ceramic materials are more desirable than the tungsten carbide.

The present invention relates to multiple section Z-bar alignment tooling which comprises the best properties of several materials. For example, in making the outer insulating caps, or outer sections of the Z-bar tooling, we have selected a material made from 95% to 97% $Al_2O_3$ which provides dielectric strength of 275 volts per millimeter, essentially an electrical insulator. The center section, which is the most fragile due to the thin cross section between the grooves and is the most susceptible to breakage due to the stresses caused by jams of cylinders, is made from cemented tungsten carbide, an excellent wear material which resists the wear of the alignment tooling occuring in the grooves. Being electrically isolated by the insulating caps, the center section no longer are eroded by sparking with the metal cylinder edges being welded. Sections of the alignment tooling can be joined by the use of adhesive or by mechanical means. Thus, a Z-bar is provided of three-piece construction which allows the material in the center groove area which has one set of operating requirements, namely wear resistance and strength, to be a different material from the outer areas used to fasten the positioning tooling to the rest of the welding machine which have a different set of operating requirements, namely electrical inertness.

A further advantage of this three-piece construction lies in the fact that with individual pieces the required "lead-ins" can relatively easily be incorporated into the pieces before assembly. If the "lead-ins" were to be added after assembly, it becomes a much more difficult and expensive operation.

Finally, the three-piece construction offers additional economies in that a piece of tooling when worn in the groove area, or made obsolete by a design change in that area, can be repaired or replaced by disassembling the parts and putting in a new central piece. This is more cost effective than replacing the entire part.

DESCRIPTION OF THE PREFERRED EMBODIMENTS

Figure 1:
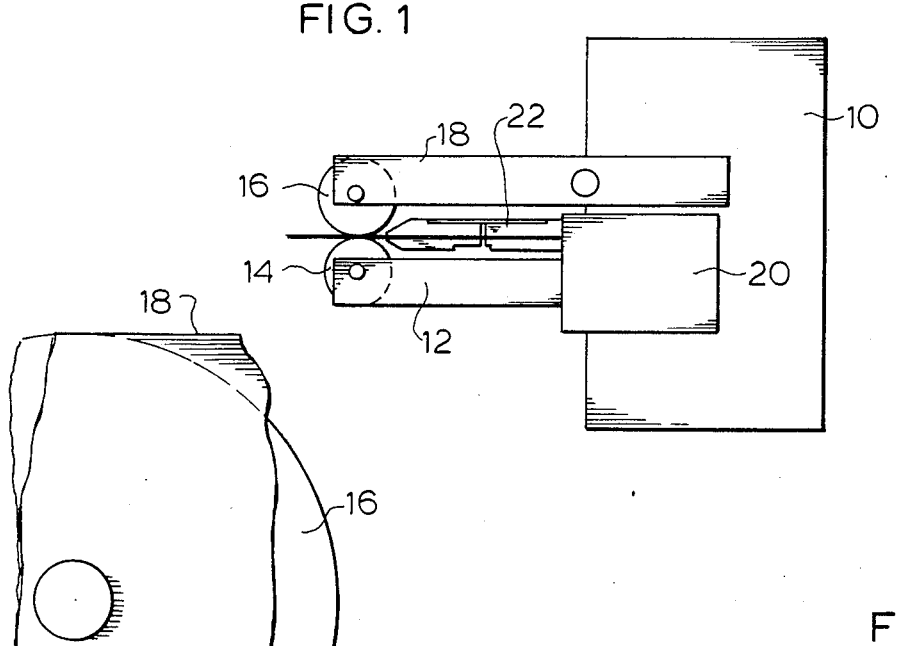
FIG. 1 is a schematic side view of a section of a resistance seam welding machine embodying the improvements of the present invention.

In FIG. 1, there is shown generally a resistance welding machine 10 which is used in connection with welding seams on the bodies of metal cans during the forming process. The machine has a lower support or arm 12 which carries an electrode roller 14 which is opposed by a second electrode roller 16 carried on a second support or arm 18. Blanks for the can bodies are rolled into a cylindrical form within the area designated at 20 and are continuously fed along guide devices or Z-bars 22 which guide the edges of the blank toward the rollers 14, 16 which perform the welding operation.

Figure 2:
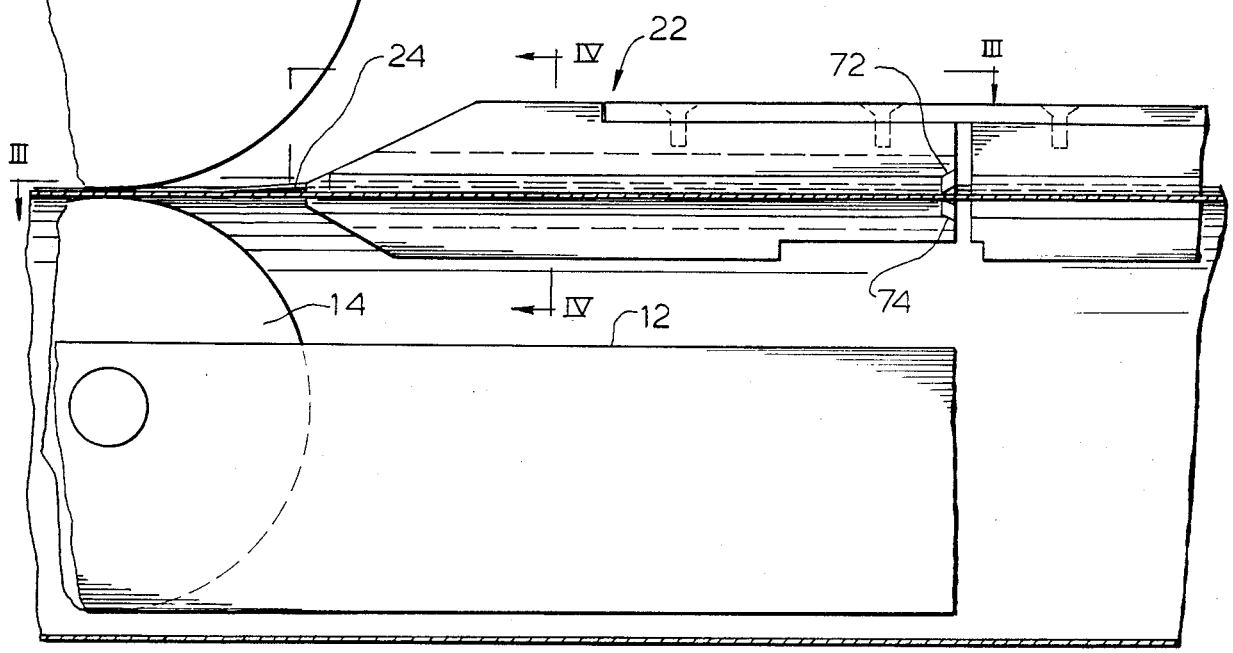
FIG. 2 is a detailed side view showing additional details of the guide device of the present invention.
Figure 3:
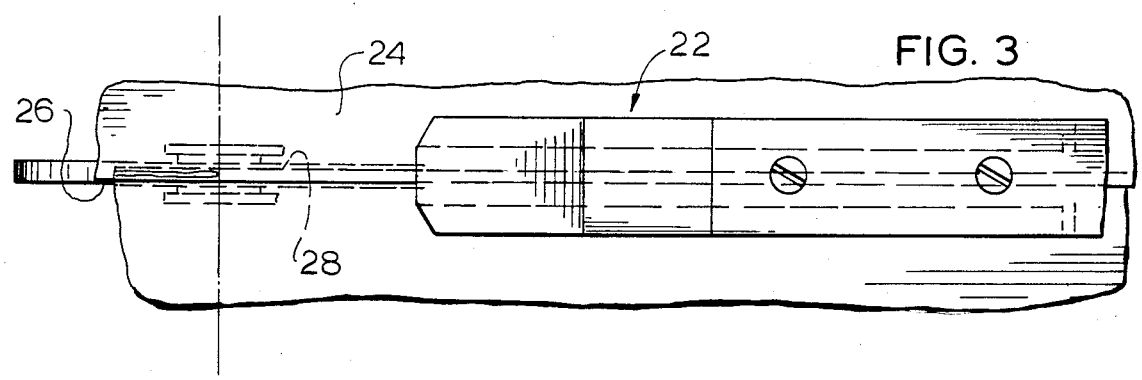
FIG. 3 is a top view of the guide device taken generally along the lines III—III of FIG. 2.
Figure 4:
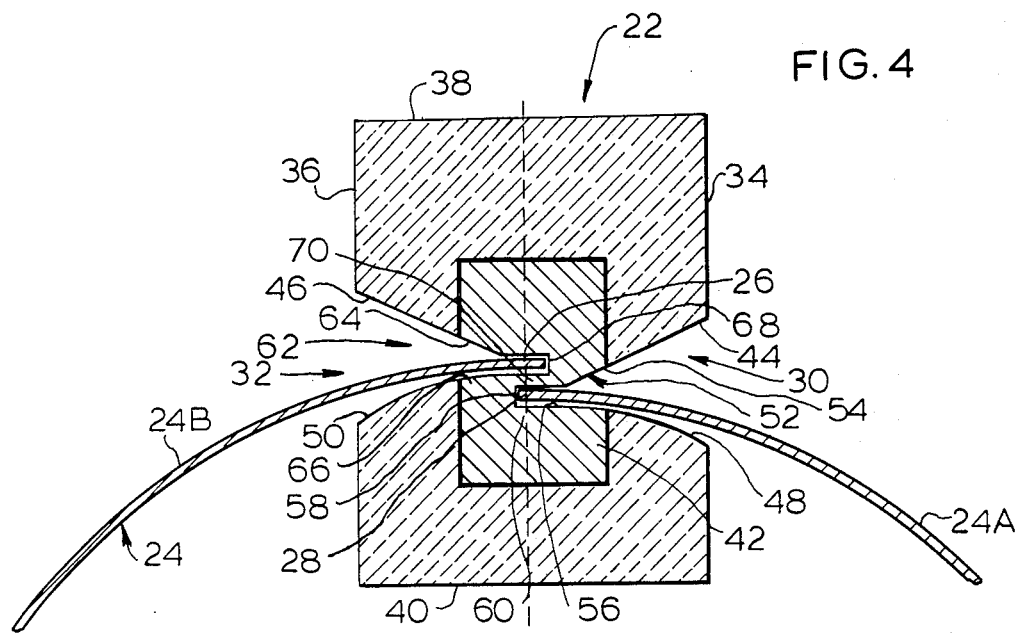
FIG. 4 is a cross sectional view of the guide device taken generally along the lines IV—IV of FIG. 2.

In FIGS. 2 and 3 a particular guide means 22 sometimes referred to as a nose piece is shown in greater detail. The can body blank 24, which has can walls 24A and 24B already rolled into a cylindrical form, is guided toward the two rollers 14 and 16. In FIG. 3 there can be seen a first edge 26 and a second edge 28 which form overlapping edges of the can body 24 which are held in alignment by the guide 22. In FIG. 4 it is seen that the guide 22 has a generally rectangular cross section with opposed grooves 30, 32 in the side walls 34, 36.

Figure 5:
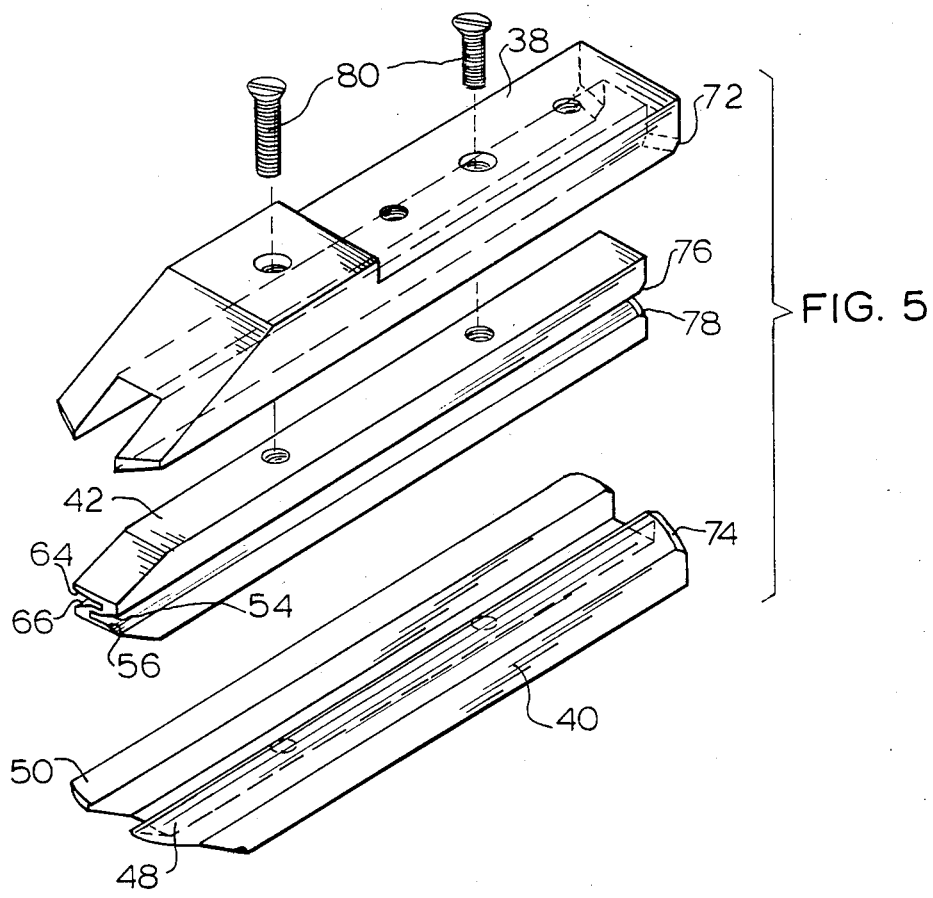
FIG. 5 is an exploded view of the separate components of the guide device.

As seen in FIGS. 4 and 5, it is contemplated by the present invention that there be provided a guide 22 which is of a three part construction comprised of a top cap 38, a bottom cap 40 and a body or central portion 42. The top cap 38 has angled bottom walls 44, 46 which form a part of the side walls of the grooves 30, 32 when the parts are assembled. The bottom cap 40 has top walls 48, 50 which are outwardly divergingly curved and which also form side walls of the grooves 30, 32 when the parts are assembled.

The angled or beveled walls 44, 46 of the top cap 38 provide a clearance for the can body. The curved walls 48, 50 provide support for the corresponding curved walls 24A and 24B of the can body 24 in the event of can body rocking or other lateral movement of part of the can body.

The body or central portion 42 has a Z-shaped cross section with a first groove 52 forming a part of groove 30 and having side walls 54, 56 which align with side walls 44 and 48 of the caps 38 and 40. The groove 52 extends into the central portion 42 to an end wall 58 which is slightly beyond a center line 60 of the central portion 42.

The central portion has a second groove 62 which corresponds in size and shape to groove 32 and has side walls 64, 66 which are aligned with side walls 46 and 50. This second groove 62 in the central portion 42 is located above the first groove 52 and an end wall 68 of the groove 62 extends slightly beyond the center line 60 such that the two grooves 52 and 62 are overlapping. A thin neck or web area 70 extends between the two grooves 52 and 62.

The grooves 62 and 52 are provided to align the edges 26 and 28 of the can body blank 24 in overlapping register with one another as it proceeds toward the welding rollers 14 and 16. By this arrangement, the ends 26 and 28 are positioned in overlapping manner so that a precise weld can be accomplished.

The overlapping nature of the grooves in the alignment tooling 22 is present because the tool shown is the nose piece which is the last alignment piece prior to the can body reaching the welding rollers. Other alignment toolings have grooves which may be overlapping to a lesser degree or not at all depending where in the cylinder forming stage they are positioned.

Because the ends 26 and 28 of the can have to be held in close alignment, there can be only a very thin web or neck 70 between the two grooves 52 and 62 in the center portion 42. By virtue of the present invention the body or center portion is fabricated of a material which has high tensile strength and which is also hard enough to resist wear of the raw edges on the can blank passing through the grooves. The characteristics of high tensile strength advantageously resist tensile stresses generated in the alignment tooling when the can blank cylinders jam due to either "stumbling" of the cylinder at high speed or due to improper timing of the cylinder movement along the tooling. "Stumbling" occurs when there is a misalignment as the can blank body passes between various guide bars such that the leading edge of the can blank would trip rather than properly enter the groove of the succeeding guide bar. We have discovered that an optimum material for the body 42 is cemented tungsten carbide having a typical range of 3% to 25% cobalt binder with the balance tungsten carbide grains. Such material should also have a Young's modulus of at least about $50 \times 10^6$ and should have a compression strength of at least 400,000 PSI, and a hardness of at least approximately fifty five (55) when measured on the Rockwell C hardness scale. Such material will thus display the requisite high tensile strength and high hardness value contemplated by the body component of the three part tool of the present invention.

To alleviate the problem of stumbling, lead-in areas or throats are provided which are shown in FIGS. 2 and 5 and which comprise sloped or beveled areas 72, 74, 76,

78. These lead-in areas or throats help to accommodate mismatching of the alignment of the successive Z-bars as the edges of the can blanks are led into the narrow slots bounded by the end walls 66 and 68.

Since a large current passes through the rolling electrodes 14, 16 which is transferred by means of the metallic can bodies 24 to the center portion of the Z-bars there is also a significant problem relating to electrical arcing through the Z-bars. Attempts heretofore made to isolate the Z-bars from the rest of the machinery so that an electrical path is not presented, have not been successful because of humidity changes, temperature changes and condensation causing insulating materials to fail whereupon current passes through the Z-bars to the remainder of the machinery. Such current passage is not only dangerous, it also represents inefficiencies relating to loss of power. Further, the electrical current passing through the Z-bars causes sparking or arcing between the can bodies and the Z-bars resulting in an erosion of the tooling and also causing a slag dust build-up on the tooling, both situations causing premature wear as well as changing the positioning of the cylinder edges.

In accordance with the present invention, the Z-bar is constructed of three parts, the two caps 38, 40 having electrical insulating properties so that the body or the central portion 42 is electrically isolated. We have discovered that a particularly advantageous choice of materials for the insulating caps 38, 40 is a ceramic material exemplified by an aluminum oxide with a chemical composition of 85% to 97% $Al_2O_3$ and with a balance comprised but not limited to $S_iO_2$, MgO, CaO to control grain properties in the ultimate properties of the aluminum oxide. Other materials, including plastic materials, may also be used so long as they possess the requisite properties of electrical inertness, durability, strength, and ability to withstand high temperature.

The three components of the Z-bar alignment tooling are joined together in unitary assembly by the use of adhesives or by mechanical means such as fasteners 80 shown in FIG. 5. It should be noted that the fastening of the body or central portion 42 to the outer caps 38, 40 is effected without impairing the electrically insulated relationship by using fasteners 80 which are also insulative in character.

The three part construction of the Z-bar alignment tooling provides additional benefits in that the body or central portion 42 is readily changed or repaired without the expense of replacing the entire tool. Also, if the particular configuration of the grooves has to be changed, for example if there is a can design change for the welding machine, then a new body can be supplied without replacing the entire tool. Thus, a cost savings is achieved.

As is apparent from the foregoing specification, the invention is susceptible of being embodied with various alterations and modifications which may differ particularly from those that have been described in the preceding specification and description. It should be understood that we wish to embody within the scope of the patent warranted hereon all such modifications as reasonably and properly come within the scope of our contribution to the art.

The embodiments of the invention in which an exclusive property or priviledge is claimed are defined as follows:

1. For use in a metal cylinder can welding machine wherein flat metal can body blanks are formed into cylinders and then seam welded, a non-arcing alignment tool comprising:
   a multiple component tool having electrically conductive and electrically isolated non-conductive components:
   a replaceable first component with two opposed grooves therein for receiving and guiding the edges of metal can body blanks with a web of material between said grooves and being made of cemented tungsten carbide with a Young's modulus of at least about $50 \times 10^6$, a compression stength of at least 400,000 PSI and a hardness of at least 55 Rockwell "C", thereby exhibiting high tensile strength and hardness,
   a second component covering a part of said first component and being secured thereto,
   said second component being constructed of an electrically non-conductive ceramic material which acts as an electrical insulator,
   said alignment tool being secured to a can welding machine at said second component, said first component being isolated from said machine by said second component to interrrupt any electrical current path between the metal can body blanks and the machine.

2. The device of claim 1 wherein said second component is secured to said first component by mechanical means.

3. The device of claim 1 wherein said second component is secured to said first component by adhesive means.

4. For use in a metal cylinder can welding machine wherein flat metal can body blanks are formed into cylinders and then electrically seam welded, a non-arcing alignment tool comprising:
   a three-piece tool having:
   a top cap portion,
   a bottom cap portion,
   and a central portion,
   said central portion being a replaceable carbide part made of material having a high tensile strength and a high hardness value and having two opposed grooves therein for receiving and guiding the edges of metal can body blanks with a web of material between said grooves,
   said top and bottom caps having beveled bottom and top walls respectively to align with said grooves,
   said top and bottom caps being constructed of an electrically non-conductive material which acts as an electrical insulator,
   said top cap portion, bottom cap portion and central portion being secured together by a fastening means,
   and said tool being fastened to a welding machine at said caps thereby to isolate said central portion against electrical current passage.

5. For use in a metal cylinder can welding machine wherein flat can body blanks are formed into cylinders and then seam welded, an alignment tool comprising:
   a three-piece tool having:
   a top cap portion fabricated from an electrically insulating aluminium oxide ceramic material,
   a bottom cap portion fabricated from an electrically insulating aluminium oxide ceramic material, and a central portion fabricated from a high strength and high hardness cemented tungsten carbide material, said central portion having two opposed grooves therein for receiving and guiding the edges of can body blanks with a web of material between said grooves, said top and bottom caps having beveled bottom and top walls respectively to align with said grooves to provide clearance for the cylindrical can bodies, said top cap portion, bottom cap portion and central portion being removably secured together by fastening means, said tool being fastened to a welding machine at said cap portions, said central portion being isolated, whereby said central portion exhibits high strength and durability, is electrically isolated from the machine by said cap portions and is removable for repair or replacement upon removal from said cap portions.

6. An alignment tool for a can welding machine comprising:

a two part integrated tool unit comprising:

a first body part made of a cemented tungsten carbide material having high tensile strength and a high hardness value and in which is formed a Z-shaped recess configuration adapted to register the edges of a can blank in overlapping welding alignment, and a second cap part means made of a ceramic electrically insulating material for connecting and mounting said first body part on the can welding machine in electrically insulated relationship therewith.

7. An alignment tool as defined in claim 6, said second cap part means comprising aluminum oxide with a chemical composition of 85% to 95% $AL_2O_3$ and with a balance comprised, but not limited to $SiO_2$, MgO and CaO.

8. An alignment tool as defined in claim 6 wherein said second cap means comprises top and bottom caps on opposite sides of said body and fastening means interconnecting the parts into an integrated unit.

9. An alignment tool as defined in claim 8 wherein said fastening means comprises an adhesive.

10. An alignment tool as defined in claim 8 wherein said fastening means comprises a mechanical fastener.

11. An alignment tool as defined in claim 10 wherein said fastener is made of electrically insulative material.

* * * * *